United States Patent [19]

Ottestad

[11] Patent Number: 5,461,901
[45] Date of Patent: Oct. 31, 1995

[54] TESTING APPARATUS FOR PRESSURE GAUGES IMPLEMENTING PNEUMATIC FEEDBACK TO CONTROL STEPLESS REGULATING VALVE

[75] Inventor: Nils T. Ottestad, Tonsberg, Norway

[73] Assignee: Ottestad Breathing Systems AS, Husöysund, Norway

[21] Appl. No.: 211,586

[22] PCT Filed: Oct. 13, 1992

[86] PCT No.: PCT/NO92/00171

§ 371 Date: May 5, 1994

§ 102(e) Date: May 5, 1994

[87] PCT Pub. No.: WO93/08454

PCT Pub. Date: Apr. 29, 1993

[30] Foreign Application Priority Data

Oct. 14, 1991 [NO] Norway ................................. 914018

[51] Int. Cl.[6] ............................................... G01L 27/00
[52] U.S. Cl. ............................................ 73/4 R; 73/4 V
[58] Field of Search ......................... 73/744, 4 R, 4 V; 91/363 R; 116/DIG. 42

[56] References Cited

U.S. PATENT DOCUMENTS

| | | | |
|---|---|---|---|
| 2,278,396 | 3/1942 | Saur | 91/363 R |
| 2,880,708 | 4/1959 | Hayner | 137/596.15 |
| 3,045,470 | 7/1962 | Crandell et al. | 73/4 R |
| 3,106,084 | 10/1963 | Hoffman et al. | 73/4 R |
| 3,125,856 | 3/1964 | Branson et al. | 91/433 |
| 4,086,804 | 5/1978 | Ruby | 73/4 R |
| 4,909,063 | 3/1990 | Olsen | 73/4 R |
| 5,257,640 | 11/1993 | Delajoud | 73/4 R |

FOREIGN PATENT DOCUMENTS

| | | | |
|---|---|---|---|
| 1173694 | 7/1964 | Germany | 73/4 R |
| 641562 | 2/1984 | Switzerland . | |

OTHER PUBLICATIONS

Derwent's Abstract No. 83–710775/28, SU 957 024, Publ. Week 8328, Kuzmin VV.

Primary Examiner—Richard E. Chilcot, Jr.
Assistant Examiner—Joseph L. Felber
Attorney, Agent, or Firm—Panitch Schwarze Jacobs & Nadel

[57] ABSTRACT

A testing apparatus for in situ calibration of various types of pressure gauges is provided for measuring absolute pressure, manometric pressure or differential pressure. The apparatus includes a reference chamber where a desired pressure can be established with very high accuracy. Pressure regulation is based on an output signal from a calibrated electronic pressure sensor connected to the reference chamber, and on a reference signal ($V_{ref}$), these signals being supplied to an electronic control circuit which controls a regulating valve. The regulating valve controls gas pressure within the reference chamber so that the pressure is established on the desired valve.

5 Claims, 1 Drawing Sheet

TESTING APPARATUS FOR PRESSURE GAUGES IMPLEMENTING PNEUMATIC FEEDBACK TO CONTROL STEPLESS REGULATING VALVE

BACKGROUND OF THE INVENTION

The invention relates to a testing apparatus for in situ calibration of pressure gauges, comprising a reference chamber for connection of the pressure gauge to be tested, a calibrated pressure sensor connected to the reference chamber, and a regulating means connected to a gas supply unit and arranged to regulate the pressure in the reference chamber.

Current fields of use of such an apparatus are e.g. control of altimeters in aircrafts and control of pressure gauges which are used to measure gas deliveries for production platforms for hydrocarbons. The pressure gauges may be constructed to measure absolute pressure, manometric pressure or differential pressure.

According to what one knows, there has not been developed mobile equipment having sufficient precision and stability to operate in the field for control/calibration of high-precision pressure gauges. Thus, common practice is to disassemble the pressure gauges at given time intervals and send these to a laboratory for a fresh control/calibration (with e.g. a "dead weight tester"). This circumstantial procedure is a natural consequence of the fact that, outside specially equipped laboratories, it is difficult to procure relevant test conditions.

One has tried various solutions with respect to procuring acceptable conditions for pressure calibration at the place of use. One has, for example, connected the pressure gauge in question and a precision pressure sensor to a common chamber of which the pressure may be regulated by means of a movable piston. It has, however, appeared to be difficult to obtain the pressure stability over time which is necessary, because even very small gas leakages or temperature changes have influence on the calibration (i.e. the pressure). Traditional pressure regulators neither has shown to be suitable in this context since the degree of regulation is too small.

SUMMARY OF THE INVENTION

Thus, the object of the invention is to provide a testing apparatus having such a high degree of regulation that the calibration can be carried out with an accuracy in the pascal region, even with line pressures up to 200 bars ($200 \cdot 10^5$ pascal).

The above-mentioned object is achieved with a testing apparatus of the introductorily stated type which, according to the invention, is characterized in that the regulating means comprises a gas flow balancing means connected to the reference chamber and arranged to create a balance between supply of gas to and delivery of gas from the chamber, and a first and a second pressure regulator connected to an inlet and an outlet, respectively, from the flow balancing means and controlled by a feedback signal from the reference chamber, so that the first regulator sees that the pressure at the inlet of said means at any time is a little higher than the pressure of the reference chamber, and the second regulator sees that the pressure at the outlet at any time is a little lower than the pressure of the reference chamber, the flow balancing means being adjustable under the influence of an output signal from an electronic control circuit having a first input for supply of the output signal from the calibrated pressure sensor, and having a second input for supply of a reference signal.

In use of the apparatus this is provided with a valve means isolating the pressure gauge in question from its original measuring point and instead connecting it to the reference chamber of which the pressure may be regulated in a stepless manner and stabilized at any chosen value. Thus, one can in a simple manner, without removing the pressure gauge, test its accuracy within the functional region of interest.

In the testing apparatus according to the invention, relevant test conditions are obtained by means of the gas flow balancing means which provides for the provision of the desired pressure in the reference chamber by creating a balance between supply and delivery of gas. The desired degree of regulation is obtained in that supply and delivery of gas take place through a pair of precision pressure regulators which, by means of a pneumatic feedback from the reference chamber, see to it that the pressure at the inlet and outlet of the flow balancing means at any time is somewhat above and below, respectively, the pressure in the reference chamber.

The pressure in the reference chamber is the "process" which is regulated in the testing apparatus. The electronic control circuit, which is controlled by the output signal from the calibrated pressure sensor and by the reference signal, is arranged to control the flow balancing means such that the output signal from the pressure sensor, i.e. the pressure in the reference chamber, adjusts itself to the desired value. The flow balancing means can make very small corrections, and the testing apparatus thus is able to adjust itself to a predetermined reference chamber pressure in accordance with the reference signal, with approximately the same accuracy as the calibrated pressure sensor. This gives the possibility to control the reference signal by means of a computer program defining the pressure in the reference chamber as a function of time. By preprogramming a suitable pressure profile for "the process", the calibration work can be made substantially more efficient.

In an advantageous embodiment of the apparatus according to the invention, the flow balancing means is a stepless regulating valve comprising a cylinder having a valve body slidably arranged therein, the inlet and outlet of said means being arranged at respective ends of the valve body, so that the valve body with displacement opens the inlet during a corresponding closing of the outlet, or vice versa, the valve body also providing for connection with the inlet and/or the outlet and the reference chamber. The regulation can take place in a stepless manner since neither gas supply nor gas delivery can be completely closed, and a given pressure in the reference chamber is maintained in that the electronic control circuit directs the valve body to a position of equilibrium wherein a small gas supply is compensated by a corresponding gas delivery.

BRIEF DESCRIPTION OF THE DRAWINGS

The invention will be further described below in connection with an exemplary embodiment with reference to the drawings, wherein.

DETAILED DESCRIPTION

Figure 1:
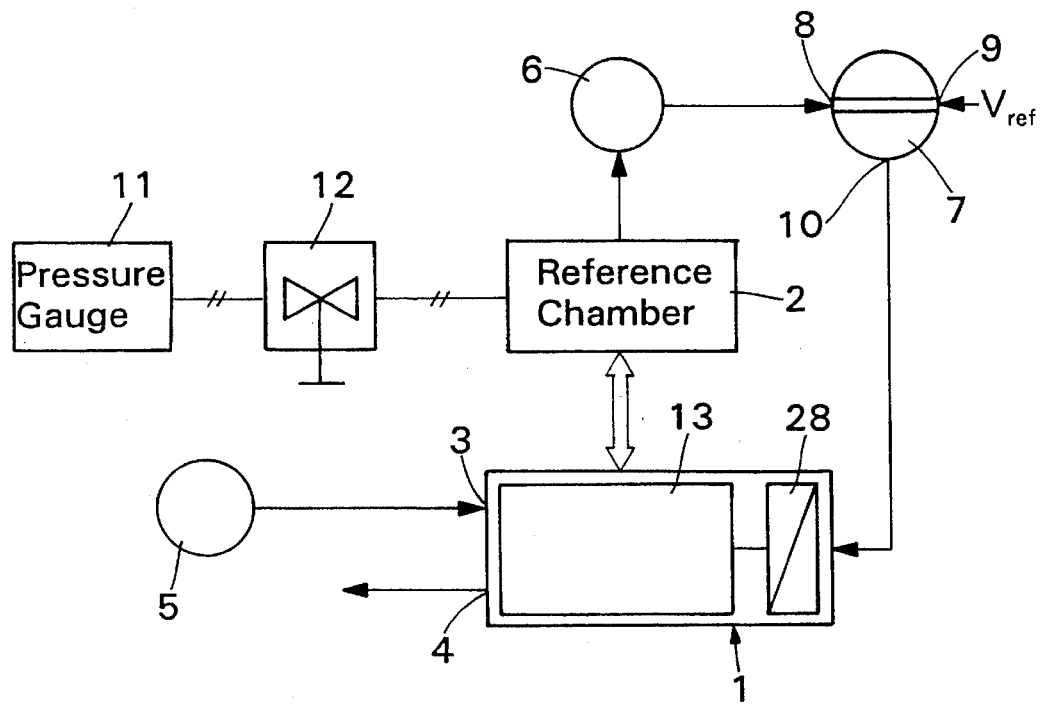
FIG. 1 shows a block diagram of a testing apparatus according to the invention.

The apparatus shown in the drawing comprises a regulating means 1 which is connected to a reference chamber 2 and which also has a gas inlet 3 and a gas outlet 4. The inlet 3 is connected to a supply unit 5 for compressed gas, and the outlet 4 communicates with the outer atmosphere, the apparatus in this case being based on the fact that the calibration is to be carried out for higher pressures than one atmosphere.

When the apparatus is to be used for calibration at pressures which are lower than one atmosphere, the outlet 4 is connected to a vacuum pump (not shown). Thereby any desired calibration pressure may be provided in the reference chamber 2, as described below.

A calibrated, electronic pressure sensor 6 is connected to the reference chamber 2 to sense the pressure therein. The pressure sensor 6 is connected to an electronic control circuit 7 through a first input 8 thereto, and the control circuit has a second input 9 to which there is supplied a reference signal $V_{ref}$ representing the desired pressure which is to be established in the reference chamber. Further, the control circuit 7 has an output 10 which is connected to the regulating means 1 to adjust this so that the desired pressure in the reference chamber 2 is obtained.

A pressure gauge 11 which is to be calibrated by means of the apparatus, is connected to the reference chamber 2 through a valve means 12.

Figure 2:
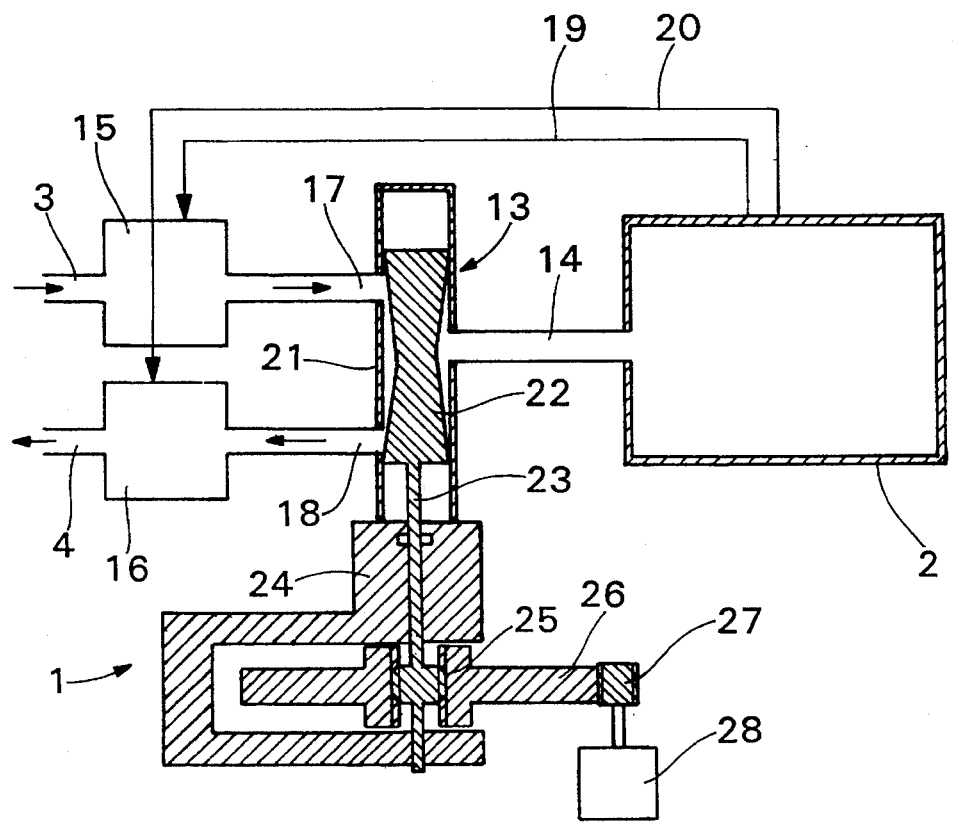
FIG. 2 shows a more detailed view of an embodiment of the regulating means in FIG. 1, in partly schematic and partly sectional form.

An embodiment of the regulating means 1 is shown in FIG. 2. This comprises a gas flow balancing means 13 which is connected to the reference chamber 2 through a channel 14 and is arranged to establish a balance between supply of gas to and delivery of gas from the reference chamber, and a first and a second precision pressure regulator 15 and 16, respectively, which are connected respectively to an inlet 17 to and an outlet 18 from the flow balancing means 13. The first pressure regulator 15 has an input corresponding to the aforementioned gas inlet 3 which is connected to the gas supply 5, whereas the second pressure regulator 16 has an output corresponding to the aforementioned outlet 4 communicating with the atmosphere, or possibly with a vacuum pump. Both pressure regulators 15, 16 have a pneumatic feedback 19 and 20, respectively, from the reference chamber 2, so that the first regulator 15 sees to it that the pressure at the inlet 17 of the flow balancing means 13 at any time is a little higher (e.g. 10 pascal higher) than the pressure in the reference chamber 2, and the second regulator 16 sees to it that the pressure at the outlet of said means is a little lower (e.g. 10 pascal lower) than the reference chamber pressure.

In the shown embodiment, the gas flow balancing means 13 consists of a steplessly adjustable valve comprising a cylinder 21 having a valve body 22 slidably arranged therein, the inlet 17 and the outlet 18 of the means being arranged at respective ends of the valve body, so that the valve body with displacement opens the inlet 17 during a corresponding closing of the outlet 18, or vice versa. Further, the valve body is designed so that a connection is provided between the inlet and the outlet and the channel 14 communicating with the reference chamber 2.

As shown, the valve body 22 is connected to an operating rod 23 which is axially displaceably arranged in a supporting body 24 and is arranged to be displaced by means of a thread transmission 25 in cooperation with a gear wheel 26 which, in the illustrated example, is driven by an additional gear wheel 27 on the output shaft of an electric step motor 28. The step motor is driven by the output signal from the control circuit 7.

It will be clear that the shown arrangement for controlling the position of the valve body only represents an example. One may choose between several solutions, the point being that the regulation can take place completely smoothly and approximately steplessly.

The manner of operation of the apparatus will be further described below.

The pressure in the reference chamber 2 is controlled by the balance between supply and delivery of gas through the channel 14. Variation in the pressure is obtained in that the valve body 22 is displaced axially and disturbs the balance between gas supply through the inlet 17 and gas delivery through the outlet 18. If, for example, one is to increase the pressure in the reference chamber 2, the gas supply is increased whereas the venting is kept at a minimum level. The total pressure in the reference chamber may be up to 200 bars, i.e. $200 \cdot 10^5$ Pa, whereas the pressure regulator 15 sees to it that the pressure difference between the inlet 17 and the channel 14 is kept stable at e.g. 10 Pa. As soon as the desired pressure is established, the regulating valve 13 is directed towards a "position of equilibrium" wherein a minimum gas supply is balanced against a corresponding gas delivery. Consequently, the regulation takes place completely steplessly, the regulating valve being able to carry out extremely fine adjustments of the pressure of the reference chamber.

If one wants, for example, to stabilize the pressure in the reference chamber 2 at 6,0000 bars, the second input 9 of the control circuit 7 is fed with a reference signal $V_{ref}$ which is identical with the output signal from the pressure sensor 6 at 6,0000 bars. The control circuit precision-controls the regulating valve and therewith the gas flow to or from the reference chamber so that the signal from the pressure sensor 6 becomes identical with the reference signal. The pressure of the reference chamber therewith will be stabilized at 6,0000 bars, and one gets established a calibration point for the pressure gauge 11 which is connected to the reference chamber in order to be calibrated.

In stations for gas measurement one is dependent on simultaneous information from two gas sensors, because of the fact that the pressure sensor response is somewhat different dependent on the current pressure level. One sensor then measures the gas pressure in front of the "choke disk" (orifice plate) over which it is to be measured, whereas the other sensor measures the pressure drop (the differential pressure) over the orifice plate. The differential pressure commonly is in the region 0–1 bar, whereas the total pressure in the gas tubes may be up to 200 bars. Accordingly, a complete calibration of these sensors will imply that one must be able to generate a wide spectrum of total pressures and differential pressures within the region of interest. This may be accomplished by utilizing two test systems, the differential pressure being taken out as the pressure difference between the respective reference chambers.

I claim:

1. A testing apparatus for in situ calibration of pressure gauges, comprising:

a reference chamber for connection of a pressure gauge to be tested, a calibrated pressure sensor connected to the reference chamber for generating a pressure sensor output signal, a gas supply unit; and a regulating means connected to the gas supply unit for regulating the pressure in the reference chamber, wherein the regulating means comprises:

a gas flow balancing means connected to the reference chamber for creating a balance between supply of gas to and delivery of gas from the reference chamber, a first pressure regulator connected to an inlet and a second pressure regulator connected to an outlet respectively, of the flow balancing means, each of the first and second regulators being controlled by a pneumatic feedback signal from the reference chamber so that the first regulator maintains the pressure at the inlet of said flow balancing means higher than the pressure of the reference chamber, and the second regulator maintains the pressure at the outlet lower than the pressure of the reference chamber, an electronic control circuit for generating an output signal for adjusting the flow balancing means, the electronic control circuit having a first input and a second input, the first input being the calibrated pressure sensor output signal, and the second input being a reference signal ($V_{ref}$).

2. An apparatus according to claim 1, wherein the first pressure regulator has an input connected to the gas supply unit and the second pressure regulator has an output connected to a vacuum pump.

3. An apparatus according to claim 2 wherein the gas flow balancing means comprises a stepless regulating valve comprising a cylinder having a valve body slidably arranged therein, the inlet and outlet of said flow balancing means being arranged at respective ends of the valve body so that displacement of the valve body opens the inlet during a corresponding closing of the outlet, and vice versa, the valve body also providing for connection between the inlet and/or the outlet and the reference chamber.

4. An apparatus according to claim 1 wherein the gas flow balancing means comprises a stepless regulating valve comprising a cylinder having a valve body slidably arranged therein, the inlet and outlet of said flow balancing means being arranged at respective ends of the valve body so that displacement of the valve body opens the inlet during a corresponding closing of the outlet, and vice versa, the valve body also providing for connection between the inlet and/or the outlet and the reference chamber.

5. An apparatus according to claim 4, wherein the valve body is connected to an operating rod which, through a gear wheel transmission is displaced by an electric step motor, the step motor being driven by the output signal from the electronic control circuit.

* * * * *